UNITED STATES PATENT OFFICE.

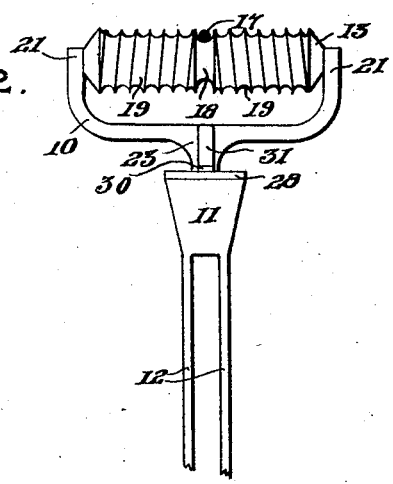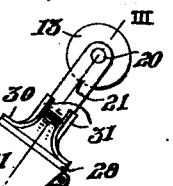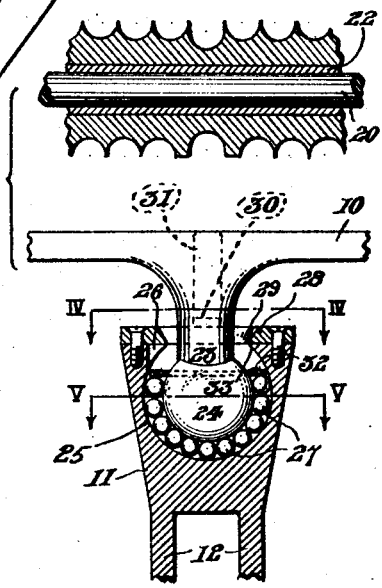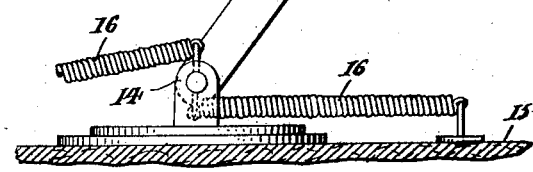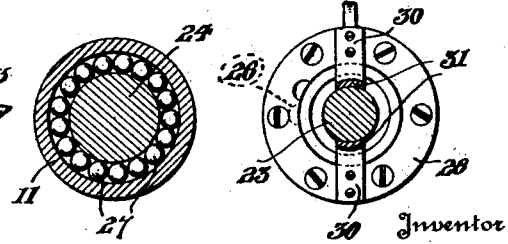

EDWARD BACZENSKI, OF HAMTRAMCK, MICHIGAN.

TROLLEY-WHEEL HARP.

1,406,812.   Specification of Letters Patent.   Patented Feb. 14, 1922.

Application filed September 15, 1921. Serial No. 500,738.

*To all whom it may concern:*

Be it known that I, EDWARD BACZENSKI, a citizen of Poland, residing at Hamtramck, in the county of Wayne and State of Michigan, have invented certain new and useful Improvements in Trolley-Wheel Harps, of which the following is a specification.

The primary object of the invention is the provision of a trolley wheel mounting means in the nature of a universal ball bearing connection between the harp and trolley pole whereby the wheel may have better connection or contact with the trolley wire.

A further object of the invention is the provision of a mounting particularly adapted for self-returning trolley wheels giving the automatic return means, when the wheel engages the trolley wire, better chance to function by means of the anti-frictional and variable mounting for the trolley wheel upon the pole.

A still further object of the invention is the provision of a trolley pole and harp construction that is easy and inexpensive to manufacture but renders the self-return of the wire to the contact groove of the wheel more certain as well as its travel when so positioned more secure.

With these general objects in view, the invention consists of the novel combination and arrangement of parts hereinafter more fully described in the accompanying drawing and pointed out in the claims.

In the drawing, like reference characters designate corresponding parts throughout the several views, and Figure 1 illustrates my invention in side elevation upon a trolley pole, the resilient mountings of the pole upon the car being also indicated.

Figure 2 is a rear elevation of the upper portion of the pole and my invention as illustrated in Fig. 1, with the trolley wire shown in vertical section positioned in the running groove of the wheel.

Figure 3 is a vertical transverse sectional view thereof with parts broken away and a portion of the harp shown in elevation, and Figures 4 and 5 are transverse sectional views taken upon lines IV—IV and V—V respectively, of Fig. 3.

Referring more in detail to the drawing, my invention broadly consists of a Y-shaped bracket or harp 10 anti-frictionally mounted in a socketed head 11 at the upper free end of the trolley pole 12 while the wire-return ing wheel 13 is journaled in the harp 10. The pole 12 is mounted in suitable brackets 14 upon the top of the car 15 having the usual spring connections 16 for resiliently holding the wheel 12 against the trolley wire 17.

The wheel 13 is elongated with a central annular groove 18 for receiving the wire 17 whereby the wheel 13 runs upon the lower side of the trolley wire during the travel of the car 15. The opposite end portions of the wheel 13 are spirally grooved as at 19 terminating in the central annular groove 18 and whereby the positioning of the wheel with either of the spiral grooves 19 receiving the wire 17, will cause the wire to run centrally of the wheel 13 into the groove 18 provided therefor. This construction is in the nature of an automatic return for trolley wheels and is described as being the form of wheel for which my invention is especially designed. A shaft 20 is secured between the opposite ends 21 of the harp 10 with the wheel 13 journaled on the shaft 20 by means of a bushing 22.

The upright or downwardly projecting central portion 23 of the harp 10 terminates in a spherical bearing member 24 positioned in a central spherical socket 25 in the head 11 of the trolley pole 12. A side slot 26 is provided as a side entrance to the socket 25 for positioning a plurality of anti-friction balls 27 within the socket 25 substantially surrounding the bearing member 24 when mounted in the socket as best illustrated in Fig. 3 of the drawing. A circular cap 28 upon the head 11 has a central outwardly flared opening 29 for accommodating the shank or upright 23 of the harp 10, the cap 28 also preventing the removal of the balls 27. The balls 27 surround the lower portion of the bearing member 24, anti-frictionally mounting the harp 10 within the socket 25.

Opposite springs 30 are secured to the cap 28 and bear against the opposite sides of the harp 10 for preventing complete rotation of the harp relatively of the head 11, but permitting partial rotation thereof as well as lateral movement in either direction. The springs 30 return the harp 10 to its normal position whenever the harp has moved relatively of the head 11, the contacting portions 31 of the springs being preferably arcuate for engaging the adjacent portions of the upright 23.

A spring split washer 32 is preferably forced into the socket 25 above the anti-friction balls 27 through the open upper entrance 33 of said socket 25. This washer further prevents the exit of the balls 27 during any violent motion that may be imparted to the trolley pole 12.

While the form of the invention herein set forth is believed preferable, it will be nevertheless understood that minor changes may be made therein without departing from the spirit and scope of my invention.

What I claim as new is:—

1. A device of the class described comprising a trolley pole having a head with a spherical socket in its upper free end, a forked harp having an upright positioned in the socket when the device is assembled, a spherical bearing member upon the bottom of said upright and a plurality of anti-friction balls mounted within the socket upon which the spherical bearing member is positioned.

2. A device of the class described comprising a trolley pole having a head with a spherical socket in its upper free end, a forked harp having an upright positioned in the socket when the device is assembled, a spherical bearing member upon the bottom of said upright, a plurality of anti-friction balls mounted within the socket upon which the spherical bearing member is positioned, an annular cap upon the end of the trolley head overlying the socket with an outwardly flared opening through which the upright of the harp extends, and arcuate positioning springs oppositely carried by said cap engaging the opposite sides of the harp.

3. A device of the class described comprising a trolley pole having a head at its free end with a spherical chamber in said head opening at the free end thereof and provided with a side entrance notch, an annular cap upon said end of the head overlying said notch and having an outwardly flared central opening communicating with the spherical chamber and a trolley harp having a spherical bearing portion anti-frictionally mounted in said chamber with a portion of the harp freely projecting through said opening.

4. A device of the class described comprising a trolley pole having a head at its free end with a spherical chamber in said head opening at the free end thereof and provided with a side entrance notch, an annular cap upon said end of the head overlying said notch, and having an outwardly flared central opening communicating with the chamber, a spherical bearing member within said chamber, a plurality of anti-friction balls within the chamber surrounding the bearing member, a harp having an upright portion carried by the spherical bearing member and freely projecting through the opening in the cap and a self-returning trolley wheel journaled in the harp.

5. A device of the class described comprising a trolley pole having a head at its free end with a spherical chamber in said head opening at the free end thereof and provided with a side entrance notch, an annular cap upon said end of the head overlying said notch, and having an outwardly flared central opening communicating with the chamber, a spherical bearing member within said chamber, a plurality of anti-friction balls within the chamber surrounding the bearing member, a harp having an upright portion carried by the spherical bearing member and freely projecting through the opening in the cap, a self-returning trolley wheel journaled in the harp, oppositely positioned springs carried by the cap having arcuate portions frictionally engaging the adjacent opposite sides of the harp whereby the upright portion of the harp is normally positioned in axial alignment with the head of the trolley pole.

In testimony whereof I affix my signature.

EDWARD BACZENSKI.